United States Patent [19]

Mukoh et al.

[11] 4,278,328
[45] Jul. 14, 1981

[54] GUEST-HOST LIQUID CRYSTAL DISPLAY DEVICE

[75] Inventors: Akio Mukoh, Hitachi; Hidetoshi Abe, Katsuta; Hideaki Kawakami, Mito; Yoshiharu Nagae, Hitachi; Hirosada Morishita, Hitachi; Eiji Kaneko, Hitachi, all of Japan

[73] Assignee: Hitachi, Ltd., Tokyo, Japan

[21] Appl. No.: 178,598

[22] Filed: Aug. 15, 1980

Related U.S. Application Data

[63] Continuation-in-part of Ser. No. 27,839, Apr. 6, 1979, abandoned.

[30] Foreign Application Priority Data

Apr. 10, 1978 [JP] Japan .................. 53-41183

[51] Int. Cl.³ ............................................. G02F 1/137
[52] U.S. Cl. .................................... 350/349; 350/346; 350/350 R; 252/299.1
[58] Field of Search ................... 350/349, 346, 350 R; 252/299

[56] References Cited

U.S. PATENT DOCUMENTS

| | | | |
|---|---|---|---|
| 3,833,287 | 9/1974 | Taylor et al. | 350/349 |
| 3,837,730 | 9/1974 | Hatfield et al. | 350/349 |
| 3,975,286 | 8/1976 | Oh | 350/350 R X |
| 4,143,947 | 3/1979 | Aftergut et al. | 350/350 R X |

OTHER PUBLICATIONS

White et al., "New Absorptive Mode Reflective Liquid-Crystal Display Devices", *Journal of Applied Physics*, vol. 45, pp. 4718–4723, Nov. 1974.

Cole et al., "Dependence of Absorption and Optical Contrast of a Dichroic Dye Guest on the Pitch of a Chiral Nematic Host", *Applied Physics Letters*, vol. 31, pp. 58–59, Jul. 15, 1977.

*Primary Examiner*—Edward S. Bauer
*Attorney, Agent, or Firm*—Craig and Antonelli

[57] ABSTRACT

A guest-host liquid crystal display device is disclosed which undergoes a focalconic-homeotropic phase transition. The device has a guest-host material layer including (a) a nematic liquid crystal having a positive dielectric anisotropy, (b) an optically active material for putting the nematic liquid crystal in a cholesteric condition, and (c) a pleochroic dye, and has an electrode means for establishing an electric field in the material layer in order that the material layer undergoes the phase transition from the cholesteric condition to the homeotropic condition. Liquid crystal molecules in contact with the surface of the electrode are oriented with their longitudinal axes perpendicular to the electrode surface, with an orientation treatment carried out in the electrode surface or by an orientation film provided on the electrode surface. Thus, the material layer assumes the focalconic condition in the absence of the electric field. A chiralnematic compound is employed as the optically active material.

11 Claims, 13 Drawing Figures

GRANDJEAN STRUCTURE

FIG.2B

FOCALCONIC STRUCTURE

FIG.2C

APPLICATION OF ELECTRIC FIELD

NEMATIC LIQUID CRYSTAL PHASE

GUEST-HOST LIQUID CRYSTAL DISPLAY DEVICE

CROSS-REFERENCE TO RELATED APPLICATION

The present application is a continuation-in-part of patent application Ser. No. 27,839 filed on Apr. 6, 1979, now abandoned.

BACKGROUND OF THE INVENTION

The present invention relates to guest-host liquid crystal display devices, and in more particular, to guest-hose liquid crystal display devices utilizing a cholesteric-nematic phase transition.

It has been already known that the application of an electric field to a mixture of a host nematic liquid crystal and a guest pleochroic dye causes the guest dye molecules to align with the applied electric field and can control the absorption of incident light by the guest molecules. The guest-host liquid crystal display device utilizing the above fact has been proposed by G. H. Heilmeiyer and L. A. Zanoni, Applied Physics Letters, 13, 91, 1968. The proposed device includes a polarizer, a liquid crystal having the dipole moment in the direction of the longitudinal molecular axis, that is, having the so-called positive dielectric anisotropy, a pleochroic dye mixed in the liquid crystal, and a pair of transparent electrodes for applying an electric field to the liquid crystal. In the absence of the applied electric field, the dye molecules are irregularly oriented, and absorb a specified wavelength component of the incident light transmitted through the polarizer to produce the colored light (colored state). When the electric field is applied to the liquid crystal, the dye molecules align in parallel to the applied electric field together with the liquid crystal molecules, thereby producing substantially the non-colored light (non-colored state). However, the above device is unsatisfactory in brightness for display and inferior in viewing angle dependence because of the use of the polarizer.

In addition to the conventional guest-host type liquid crystal display devices of this kind, other guest-host display devices have been proposed in which a helical molecular ordering structure (a cholesteric condition) is established in a nematic liquid crystal by adding thereto an optically active material. Such guest-host liquid crystal display devices are disclosed in U.S. Pat. Nos. 3,833,287 and 3,837,730 which do not employ any polarizer. Further, in the above devices, the molecular axes of a guest pleochroic dye dissolved in the host material assume a helical molecular ordering in accordance with the helical molecular ordering structure of the host material. The helical axis is directed to the electrode, that is, lies in the direction parallel to an applied electric field.

A cholesteric liquid crystal phase, in which the helical axis of the helical molecular ordering structure is parallel to the applied electric field, is called a gradjean condition. In the absence of an applied electric field, the guest and host materials are put into a grandjean condition, and thus the guest material absorbs incident light to put the guest and host materials in a relatively colored state. On the other hand, when an electric field is applied, the helical molecular ordering or twisting is reversed to reorient the guest and host molecules in parallel to the applied electric field. Thus, the incident light is scarcely absorbed by the guest material, thereby putting the guest and host materials in a substantially non-colored state.

Besides the grandjean condition, there is another cholesteric liquid crystal phase in which the helical axis of the helical molecular ordering structure is perpendicular to the applied electric field. Such a phase is generally called a focalconic condition, and a display cell such as having a cholesteric phase which are put in a focalconic condition in the absence of an applied electric field, is known. An article entitled "New absorptive mode reflective liquid-crystal display device" by Donald L. White and Gary N. Taylor (Journal of Applied Physics, Vol. 45, No. 11, Nov., 1974, pp 4718–4723) disclosed and teaches the following. The guest and host materials which exhibit a grandjean condition and a focalconic condition in the initial state having no applied electric field, undergo a phase transition by the application of an electric field into a so-called nematic phase or a homeotropic condition in which the guest and host molecules are aligned parallel to the applied electric field. The transition voltage $V_T$ necessary for the phase transition from the grandjean or focalconic condition to the homeotropic condition is given by the following equation $V_t = 1.39 D/P$, where P indicates the pitch of helical molecular ordering structure when the guest and host materials exhibit a cholesteric phase, and D the gap of display cell. In detail, White and Taylor shows $P \leq 6.7$ μm and $D = 12$ μm, i.e., $D/P \geq 4$. Furthermore, an article by H. S. Cole, Tr and S. Aftergut, "Applied Physics Letters" Vol. 31, No. 2, July 15, 1977 shows about $D/P \geq 2$ and that contrast ratio increases as a ratio of D/P increases.

SUMMARY OF THE INVENTION

An object of the present invention is to provide a guest-host liquid crystal display device which can be driven with a lower voltage.

The present invention proposes a guest-host liquid crystal display device having a guest-host liquid crystal layer sandwiched between a pair of substrates each provided with an electrode for applying an electric field to said liquid crystal layer, wherein said electrode includes a surface in contact with the liquid crystal layer being subjected to a perpendicular orientation treatment for orienting liquid crystal molecules in contact with the surface of the electrode with their longitudinal axes perpendicular to the surface of the electrode, and the liquid crystal layer includes (a) a nematic liquid crystal having a positive dielectric anisotropy, (b) an optically active material for imparting to the nematic liquid crystal a phase transition into a cholesteric condition, and (c) a pleochroic dye for absorbing light incident on the liquid crystal layer in the absence of an electric field applied thereto. The feature of the present invention resides in that the pitch in the cholesteric condition being equal to substantially 1 times the thickness of the liquid crystal layer.

In a liquid crystal display device according to the present invention, when no electric field is initially applied to a liquid crystal layer, the liquid crystal layer exhibits a helical molecular ordering structure, that is, is put into a so-called cholesteric condition, more specifically, into a focalconic condition, and a guest pleochroic dye absorbs incident light to produce a colored state. When an electric field is applied to the liquid crystal layer, the liquid crystal molecules are oriented parallel to the applied electric field together with the pleochroic dye molecules to establish a homeotropic molecular ordering which corresponds to a nematic liquid crystal phase. Thus, the incident light is scarcely absorbed by the dye molecules, thereby producing substantially a non-colored state. The focalconic condition called in the present application is obtained by subjecting electrode surfaces in such a treatment as orienting liquid crystal molecules in contact with the electrode surfaces perpendicularly to the electrode surfaces.

The inventors of the present invention have made experiments on the transition voltage required when a liquid crystal undergoes a phase transition from grandjean to homeotropic condition or from focalconic to homeotropic condition, and found that the transition voltage ($V_{FH}$) needed for the phase transition from the focalconic to the homeotropic condition is lower than that ($V_{GH}$) for the phase transition from the grandjean to the homeotropic condition. This fact clearly shows that the display device with a liquid crystal layer initially assuming a focalconic condition can be driven with a lower voltage compared with a device that a liquid crystal layer is put into a grandjean condition in the initial state.

The inventors have further studied the relationship between the pitch of a liquid crystal having a helical molecular ordering structure, that is, the pitch of the so-called focalconic liquid crystal phase and the storage effect of the liquid crystal. The storage effect is defined in the present application by a time required for a liquid crystal to return to an original focalconic condition when a voltage applied to the liquid crystal is made equal to zero volt after a phase transition from a focalconic to a homeotropic condition was established. It can be said that the smaller the storage effect the higher the responsibility to an applied voltage of the liquid crystal. The result of the above study has shown that the liquid crystal has an excellent responsibility as far as the ratio d/p approaches 1, where d is the gap of a cell and p is the pitch. The term "pitch" used in the present application is defined by a distance in which liquid crystal molecules having a predetermined direction are subjected to a rotation of 360 degrees in a cholesteric liquid crystal phase.

As described previously, an optically active material is employed to effect a phase transition from a nematic liquid crystal phase to a cholesteric liquid crystal phase. The pitch of the cholesteric phase can be controlled by the concentration of optically active material. Chiralnematic compounds proposed in the present invention can set the pitch to a value in a predetermined range with a lower concentration compared with steroid compounds. Further, a relationship exists between the concentration of optically active material and the transition voltage needed for a cholestricnematic phase transition, and the transition voltage is reduced as the concentration of optically active material becomes lower. Accordingly, in order to drive a liquid crystal display device with a lower voltage, it is required to reduce the concentration of optically active material. However, a greater part of the optically active materials have twisting powers too weak to satisfy the pitch range required in the present invention. This results in addition of a large quantity of the optically active material, to remarkably reduce an operative temperature range of the liquid crystal and to increase viscosity of the liquid crystal so as to decrease the response speed. The inventors of this application have found that a substance such as chiralnematic compounds which gives a strong twisting power even with a small quantity of addition, solve this drawback. The term "optically active material" is defined in the present application as a material in which the plane of polarization of linearly polarized light is rotated as the light passes through the material.

The inventors have further considered a relationship between the contrast ratio of a guest-host liquid crystal material used in the present invention and the pitch, and a relationship between the transition voltage and the pitch. The contrast ratio becomes a little smaller as the pitch becomes longer. The transition voltage is reduced as the pitch becomes longer, and takes the minimum when $d/p = 1$.

However, a liquid crystal layer according to the present invention has such a property that the liquid crystal layer cannot assume a focalconic condition in the initial state if the pitch exceeds the thickness of the liquid crystal layer, i.e., $d/p < 1$. In this case, the liquid crystal layer exhibits a homeotropic condition and therefore cannot be used. Thus, the pitch must be determined to substantially equal to the thickness of the liquid crystal layer.

DESCRIPTION OF THE PREFERRED EMBODIMENTS

Now, an embodiment of a guest-host liquid crystal display device according to the present invention will be explained with reference to the accompanying drawings, in which like reference numerals indicate like parts.

Figure 1A:
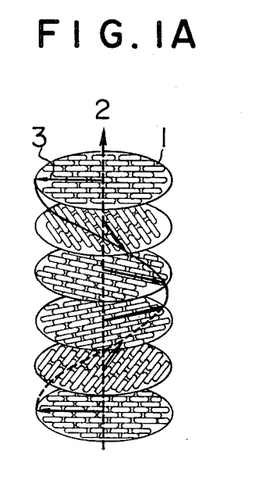
FIGS. 1A and 1B are schematic views for showing a cholesteric liquid crystal and for showing the orientation and pitch of cholesteric liquid crystal molecules, respectively.
Figure 1B:
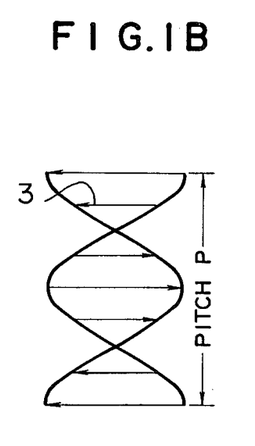

A guest-host liquid crystal material used in the present invention exhibits a cholesteric phase in the initial state having no applied electric field. Referring to FIGS. 1A and 1B showing a cholesteric liquid crystal, the cholesteric liquid crystal is composed of a plurality of layers each including therein liquid crystal molecules 1 whose longitudinal axes 3 are aligned parallel to each other, and the direction of the longitudinal axes 3 of the molecules 1 turns on a helical axis 2. The pitch of a cholesteric liquid crystal is equal to a distance required for the direction of the longitudinal molecular axes to effect a rotation of 360 degrees, and can be determined by employing a "wedge-shaped cell" similar to that shown in an article by R. Cano (Bull. Soc. Fr. Mineral Cristallogr., 91, 20, 1968).

Figure 2A:
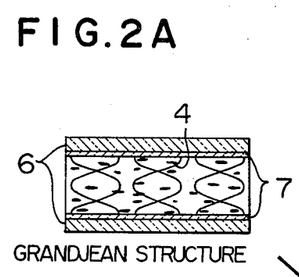
FIGS. 2A, 2B and 2C are sectional views for showing a grandjean condition, a focalconic condition and a homeotropic condition of a guest-host liquid crystal material, respectively.
Figure 2B:
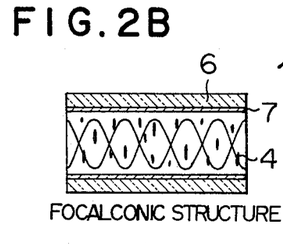
Figure 2C:
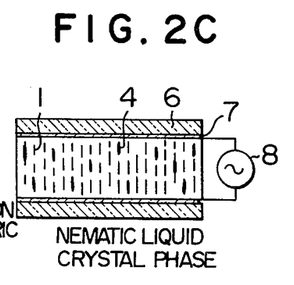

A guest-host liquid crystal according to the present invention includes (a) a nematic liquid crystal having a positive dielectric anisotropy, (b) an optically active material for converting the nematic liquid crystal to a cholesteric phase, and (c) a pleochoric dye, and therefore exhibits a cholesteric phase in the initial state. The cholesteric phase includes a grandjean structure as shown in FIG. 2A in which the helical axis is placed in parallel to an applied electric field, and a focalconic structure as shown in FIG. 2B in which the helical axis is placed perpendicularly to an applied electric field, and assumes in both structures an opaque state which is milky and scatters light. When an electric field is applied to the liquid crystal, the liquid crystal molecules 1 are aligned parallel to the applied electric field together with the pleochroic dye molecules 4, as shown in FIG. 2C. That is, the cholesteric phase undergoes a phase transition into a nematic phase, and the liquid crystal exhibits the so-called homeotropic condition. As mentioned previously, the focalconic condition is employed for liquid crystal display devices according to the present invention. In order to establish the focalconic structure, those surfaces of electrodes 7 which are put in contact with the liquid crystal, are subjected to such a perpendicular orientation treatment that the longitudinal axes 3 of liquid crystal molecules 1 in contact with the electrode surfaces are oriented perpendicularly to the electrode surfaces. The perpendicular orientation treatment can be carried out using a silicon series compound such as silicon grease or polymethylphenylsiloxane, lecithin, the so-called surfactant such as fluorine type surfactant or phosphoric type surfactant, a metal oxide such as zirconium oxide or yttrium oxide, a metal fluoride such as calcium fluoride or cerium fluoride, and a silane coupling agent. Specifically, the fluorine type surfactant, lecithin and metal oxide are preferred.

Steroid compounds, chiralnematic compounds, terpenoid, and so on can be employed as the optically active material for converting a nematic liquid crystal into a cholesteric phase. In the present invention, the chiralnematic compounds are specifically employed as described later in greater detail.

Figure 3A:
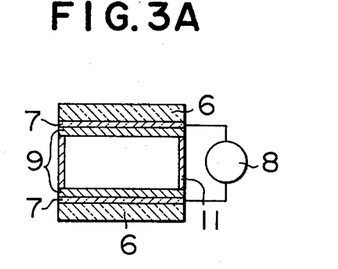
FIGS. 3A, 3B and 3C are sectional views for showing different cell structures of guest-host liquid crystal display devices according to the present invention, respectively.
Figure 3B:
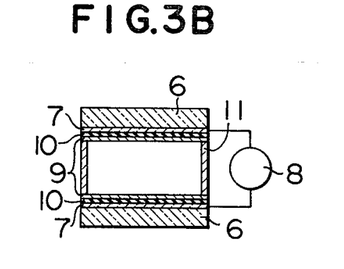
Figure 3C:
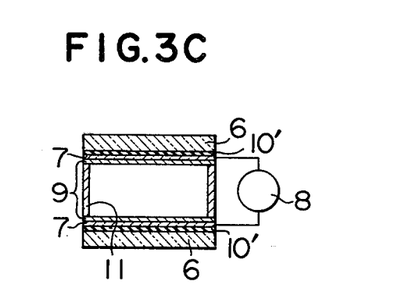

FIGS. 3A, 3B and 3C show embodiments of a liquid crystal display device according to the present invention. In these figures, reference numeral 6 indicates transparent substrates, and 7 transparent electrodes. For a reflection-type display device, one of the substrates or one of the eletrodes is made of a reflective material. Reference numeral 9 indicates orientation films, and 11 spacers. Numeral 10 is an insulating film mounted on the electrodes 7 in any figure in which current flow is blocked for attaining any display. Numeral 10' is an insulating film for preventing impurities contained in the substrates 6 from dissolving or being injected into the liquid crystal layer, which results in accelerating deterioration or change in quality of the liquid crystal layer. A liquid crystal display device according to the present invention includes the transparent electrode 7 provided on at least one of the transparent glass substrates 6 and having a desired pattern, the spacers 11 for opposing a pair of electrode surfaces to each other in a parallel relation. Cell gaps of 3 to 100 μm may be used, with cell gaps of 5 to 15 μm being preferred for practical use.

Figures 4, 5:
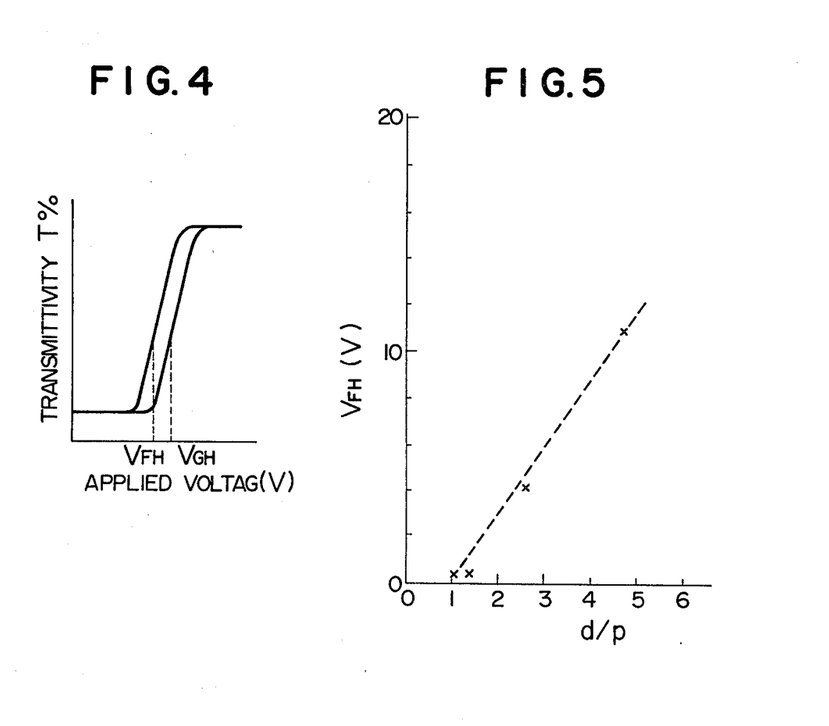
FIG. 4 is a graphic representation of voltage-transmittivity characteristics in phase transitions from grandjean to homeotropic and focalconic to homeotropic, respectively.
FIG. 5 is a graph for showing a relationship between the transition voltage ($V_{FH}$) and the ratio d/p in a cholesteric phase of a guest-host material according to the present invention.

FIG. 4 shows applied voltage versus transmissivity characteristic curves in a phase transition from a grandjean or focalconic condition to a homeotropic condition. In the absence of an applied electric field, a guest-host material exhibits a characteristic color in both grandjean and focalconic conditions. The guest-host material undergoes a phase transition from the above conditions to a homeotropic condition by the application of an electric field, and thus becomes non-colored condition. As will be described later, the transition voltage $V_{FH}$ required to effect the phase transition from the focalconic to the homeotropic condition in accordance with the present invention is lower than the transition voltage $V_{GH}$ in the phase transition from the grandjean to the homeotropic condition.

A nematic liquid crystal having a positive dielectric anisotropy, which is used in the present invention, can be selected from various kinds of materials exhibiting a nematic phase in an operating temperature range. On the other hand, a nematic liquid crystal having a negative dielectric anisotropy is hard to exhibit a stable focalconic condition in a stationary state, and often requires a driving voltage $V_H$ of more than several tens volts.

Various materials shown in the following Table 1 and their derivatives can be employed as the liquid crystal having the positive dielectric anisotropy.

TABLE 1

| | Kind | Example |
|---|---|---|
| 1 | biphenyl type | R—⟨⟩—⟨⟩—X |
| 2 | ester type | R—⟨⟩—COO—⟨⟩—X |
| | | X—⟨⟩—COO—⟨⟩—R |
| 3 | schiff base type | R—⟨⟩—CH=N—⟨⟩—X |
| | | X—⟨⟩—CH=N—⟨⟩—R |
| 4 | thioester type | R—⟨⟩—COS—⟨⟩—X |
| 5 | pyrimidine type | R—⟨⟩—⟨N=N⟩—X,  R—⟨N=N⟩—⟨⟩—X |
| | | R—⟨⟩—⟨N=N⟩—X,  R—⟨N=N⟩—⟨⟩—X |
| 6 | terphenyl type | R—⟨⟩—⟨⟩—⟨⟩—X |
| | | R—⟨H⟩—⟨⟩—⟨⟩—X |
| | | R—⟨⟩—⟨N=N⟩—⟨⟩—X |
| | | R—⟨H⟩—⟨N=N⟩—⟨⟩—X |

TABLE 1-continued

| Kind | Example |
|---|---|
| 7 diester type | R—〈H〉—〈○〉—〈○〉—〈H〉—R<br>R—〈○〉—COO—〈○〉—COO—〈○〉—X<br>X—〈○〉—COO—〈○〉—COO—〈○〉—R<br>R—〈○〉—OCO—〈○〉—COO—〈○〉—X |
| 8 biphenyl-ester type | R—〈○〉—〈○〉—COO—〈○〉—X<br>X—〈○〉—〈○〉—COO—〈○〉—R |
| 9 phenyl-cyclohexane type | R—〈H〉—〈○〉—X |
| 10 cyclohexyl benzoate type | R—〈H〉—COO—〈○〉—X<br>R—〈H〉—COO—〈○〉—R' |

R indicates $C_nH_{2n+1}$ or $C_nH_{2n+1}O$, and X indicates $NO_2$, CN, halogen, alkyl radical or alkoxy radical.

All the materials shown in Table 1 except the schiff base type in the third row are liquid crystals exhibiting non color. For color display, non color is preferred. The biphenyl type is most preferable to any other types for a liquid crystal used in the present invention.

Further, an ester type, azoxy type, azo type, shiff base type, pyrimidine type, diester type, or biphenylester type liquid crystal, which has a negative dielectric anisotropy, can be employed when mixed with a liquid crystal having a positive dielectric anisotropy or compounds which is able to attain the positive dielectric anisotropy, so as to have as a whole a positive dielectric anisotropy.

A chiralnematic compound, for example, a compound such as having introduced an optically active group (2-methylbutyl group, 2-methyl-butoxy group, 3-methylpentyl group, 3-methylpentoxy group, 4-methylhexyl group, 4-methylhexoxy group, or the like) into a nematic liquid crystal, is employed as the optically active material in the present invention. The above compound is different from a steroid compound (cholesterine compound). Further, there can be employed in the present invention optically active materials as follows: an alcohol derivative such as l-menthol or d-borneol, a ketone derivative such as d-camphor or 3-methylcyclohexanone, a carboxylic acid derivative such as d-citronellic acid or l-camphoric acid, an aldehyde derivative such as d-citronellal, an alkene derivative such as d-limonene, other amine, amide and nitrile derivatives. These optically active materials are shown in a Japanese Patent Application (Application No. 98005/75, Laid-open No. 45546/76) corresponding to a U.S. Patent Application Ser. No. 498,799 filed Aug. 14, 1974, by G. E. Adams et al.

The above-mentioned optically active material is added in an appropriate concentration to a nematic liquid crystal so as to make the pitch p of the liquid crystal mixture in a focalconic condition equal to substantially 1 time the thickness of liquid crystal layer or the cell gap d. The concentration of optically active material cannot be determined sweepingly since it is varied in dependence upon the kinds of nematic liquid crystal used and pleochroic dye, but is required to be at least 0.5% by weight of the mixture if $d \simeq 10\mu$. A decrease in concentration of the optically active material makes it possible to drive the liquid crystal cell with a lower voltage. Further, the optically active material has usually a function of narrowing a temperature range within which a liquid crystal mixture is maintained in the state of liquid crystal. Thus, the concentration of optically active material is desired to be less than 10% by weight so as not to narrow the temperature range.

Many dyes such as shown in Table 2 are usable for the pleochroic dye employed in the present invention. A desired dye is selected from among these dyes on the basis of the compatibility between liquid crystal and dye, the order parameter S, the wavelength exhibiting the absorption maximum, and the stability. Though the concentration of dye is varied in dependence on the absorption spectrum of dye, the coefficient of light absorption and the cell gap, a concentration exceeding 0.1% by weight is needed, specifically, a concentration within a range of 0.5% to 5% by weight is preferred.

TABLE 2

TABLE 2-continued

| | |
|---|---|
| 16 |  |
| 17 |  |
| 18 |  |
| 19 |  |
| 20 |  |
| 21 |  |
| 22 |  |
| 23 | <br>X = —$C_2H_5$ |
| 24 | the same constitutional formula as the 23rd row<br>X = —$OC_5H_{11}$ |
| 25 | the same constitutional formula as the 23rd row<br>X = —$N(CH_3)_2$ |
| 26 | the same constitutional formula as the 23rd row<br>X = —$C_4H_9$ |

The anthraquinone type dye shown in the 22nd row of Table 2 is specifically preferred, because the deterioration due to ultraviolet rays is very little.

Now, various embodiments of the present invention will be explained below.

Embodiment 1

Four kinds of nematic liquid crystals each having a positive dielectric anisotropy, that is, 4-pentyl-4'-cyanobiphenyl, 4-heptyl-4'-cyanobiphenyl, 4-octoxy-4'-cyanobiphenyl and 4-heptylphenyl-4'-cyanobiphenyl, are mixed in a ratio by weight of 50:28:15:7 to form a composition which can be maintained in the state of liquid crystal in a temperature range of 0° to 60° C. The 4-(2-methylbutyl)-4'-cyanobiphenyl is added as the optically active material to the composition in a range of 1% to 20% by weight. Further, the dye shown in the 19th row of Table 2 is mixed as the pleochroic dye in the composition in a concentration of 1% by weight. The mixture 31 thus obtained is heated to be isotropic and then cooled, and the heating and cooling processes are repeated to dissolve the dye enough. The above liquid crystal mixture is introduced into a cell as shown in FIG. 3A which includes a pair of transparent electrodes having their facing surfaces coated with a fluorine type surfactant, that is, FX-161 (trade name) manufactured by Sumitomo 3M Co., and which has a cell gap of 10 μm.

When the concentration of 4-(2-methylbutyl)-4'-cyanobiphenyl is made less than 1.3 weight percent, the pitch of the liquid crystal mixture becomes more than 10 μm. In such a case, the mixture has a tendency to assume a homeotropic condition and is hard to assume a focalconic condition. Therefore, the pitch has to be set below the thickness of the mixture. The cell has the ratio d/p versus transition voltage $V_{FH}$ characteristic shown in FIG. 5. That is, the transition voltage $V_{FH}$ is low as far as d/p approaches 1.

Embodiment 2

A liquid crystal mixture (32) shown in the following composition of a phenylcyclohexane series, which contains the optically active material used in the embodiment 1 in the concentration of 1.2% by weight and contains the pleochroic dye of the number 19 (λmax 624 nm) in Table 2 in the concentration of 1% by weight, is introduced into two cells to form a cell assuming a focalconic condition in the initial state and another cell assuming a grandjean condition in the initial state. An applied voltage versus transmissivity characteristic is measured by experiments for each of the cells, and the measured transition voltages are shown in the following Table 3.

| 32 | 4-cyanophenyl-4'-propylcyclohexane<br>4-cyanophenyl-4'-pentylcyclohexane<br>4-cyanophenyl-4'-pentylcyclohexane<br>4-cyano-(4'-pentylcyclohexyl)biphenyl |
|---|---|

TABLE 3

| Embodiment No. | Pleochroic Dye Row No. of Table 2 | $\lambda_{max}$ (nm) | Transition Voltage V (V) $V_{FH}$ | $V_{GH}$ |
|---|---|---|---|---|
| 1 | 19 | 624 | 0.40 | 2.9 |
| 2 | 19 | 624 | 0.41 | 3.2 |
| 3 | 21 | 451 | 0.41 | 3.3 |
| 4 | 22 | 568 | 0.42 | 3.3 |

Embodiment 1 in Table 3 contains the optical active material of 1.3 percent by weight.

Embodiment 3

A liquid crystal mixture such that the pleochroic dye of the liquid crystal mixture employed in Embodiment 2 is replaced by the dye (having an absorption maximum at 351 nm) shown in the 21st row to Table 2, is employed to carry out experiments similar to Embodiment 2. The measured transition voltages are also shown in Table 3.

Embodiment 4

A liquid crystal mixture obtained by replacing the pleochroic dye of the liquid crystal mixture employed in Embodiment 2 by the dye (having an absorption maximum at 568 nm) shown in the 22nd row of Table 2, is employed to carry out similar experiments. The measured transition voltages are also shown in Table 3.

In Table 3, $V_{FH}$ indicates a transition voltage required for a focalconic-homeotropic phase transition, and $V_{GH}$ a transition voltage required for a grandjean-homeotropic phase transition. FIG. 4 shows applied voltage versus transmissivity characteristics in one of Embodiments 2, 3, and 4. As is evident from FIG. 4 and Table 3, the value of $V_{FH}$ is lower than that of $V_{GH}$ independently of the kind of pleochroic dye used.

Embodiment 5

Figures 6, 7:
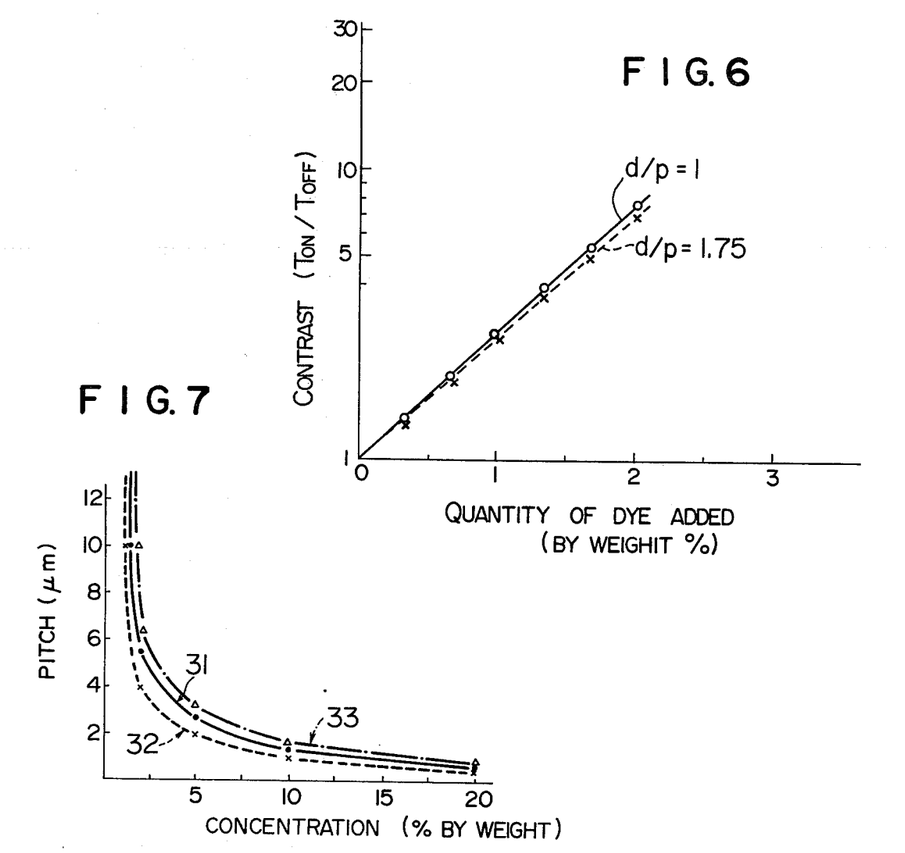
FIG. 6 shows a relationship between d/p and the contrast in the guest-host material according to the present invention.
FIG. 7 is a graph for showing a relationship between the concentration of optically active material and the pitch of a cholesteric phase in each of cases when a chiralnematic compound is added as the optically active material to three kinds of nematic liquid crystals.

A liquid crystal mixture as shown in embodiment 2 is used here except for replacing the pleochroic dye used in the Embodiment 2 by the following azo series dye for measuring d/p-$V_{FH}$ relationship:

The result is shown in FIG. 5. Furthermore, a relationship between the contrast ratio and the quantity of an additive of dye, with a parameter of d/p is measured as shown in FIG. 6. The contrast ratio is obtained on the basis of Ton/Toff, which indicates a ratio of light transmittivity (Ton) in a liquid crystal cell when the voltage is applied to the cell, to the light transmittivity (Toff) when the voltage is not applied to the cell. There is no substantial difference between d/p=1 and d/p=1.75. Thus, it can be concluded from the results of FIG. 5 that the cell becomes good as far as d/p approaches 1.

Embodiment 6

The anthraquinone type dye shown in the 22nd row of Table 2 is added in a concentration of 3% by weight to those mixtures of the nematic liquid crystal compositions (sample nos. 31 and 32) and the chiralnematic material, which are employed in Embodiments 1 and 2 and assume cholesteric conditions, and the resulting mixtures are introduced in cells (having a cell gap of 10 μm) described in Embodiment 1, in order to know the relationship between the ratio d/p and the storage effect. As regards storage effect, when an applied voltage is reduced to 0V after the phase transition from a focalconic to homeotropic condition, mixtures capable of returning to the focalconic condition in one second are indicated by "o" in the following Table 4, and mixtures taking more than one second are indicated by "x".

TABLE 4

| | Nematic Liquid Crystal Composition | |
|---|---|---|
| | Sample No. 31 | Sample No. 32 |
| d/p | Memory Effect | Memory Effect |
| 1.2 | o | o |
| 2.3 | x | x |
| 5.1 | x | x |

Table 4 shows that the mixtures having d/p being near 1, have a storage effect less than one second, and therefore are suitable for a static drive.

Embodiment 7

In Embodiment 6, the cell gap is varied in a range 6 to 48 μm and the concentration of 4-(4-methylhexyl)-4'-cyanobiphenyl (a chiralnematic compound) is adjusted, in order to make the ratio of d/p equal to 1, 2, 3, 4, 5 and 10. The same results were obtained as that of Table 4. In addition, it was found that the transition voltage ($V_{FH}$) is high as the cell gap is longer.

Embodiment 8

The phenylcyclohexane type liquid crystal composition (sample 32) is employed as the nematic liquid crystal.

The 4-(2-methylbutyl)-4'-cyanobiphenyl which is an optically active material, is added in a concentration of 1.2% by weight to the liquid crystal composition. The mixture thus obtained assumes a cholesteric condition, and is 7.8 μm in pitch. Further, the dye (having an absorption maximum at 557 nm) shown in the 26th row of Table 2 is added in a concentration of 2% by weight to and dissolved into the above cholesteric liquid crystal mixture. The resulting mixture is introduced into a reflection-type cell having a cell gap of 10 μm, i.e. d/p=1.2 and including a transparent electrode whose surface is treated with lecithin or coated with a yttrium oxide film. The application of a driving voltage of 1.5 V changes the color of an electric field applied portion from purplish red to colorless and produces a clear color display in two cells, one of which is subjected to the lecithin treatment and the other includes the yttrium oxide film.

On the other hand, each of the above-mentioned cholesteric liquid crystal mixtures containing the dye is introduced into a cell having an electrode, which is subjected to a parallel orientation treatment, that is, coated with a polyimide film and then rubbed, to assume a grandjean condition. In this case, a driving voltage exceeding 6 V is required for the color change from purplish red to colorless. Moreover, a color shading takes place after the applied voltage is removed. These phenomena are specifically observed when a cholesteric liquid crystal assumes a grandjean condition.

Embodiment 9

The object of this embodiment is to show below that a chiralnematic compound is specifically effective as the optically active material used in the present invention. To compare chiralnematic compound with steroid compound, 4-(2-methylbutyl)-4'-cyanobiphenyl which is one of chiralnematic compounds, and cholesteric chloride which is one of steroid compounds, are respectively mixed in three kinds of nematic liquid crystals (sample nos. 31 and the following nos. 33 and 34) in various concentrations to see the relationship between the concentration of optically active material and the pitch of liquid crystal mixture. The nematic liquid crystals nos. 33 and 34 used are as follows: sample number 31 is entirely the same as the liquid crystal composition used in Embodiment 1,

| sample number 33 | 4-butyl-4'-cyanophenyl benzoate | 27% by weight |
| --- | --- | --- |
| | 4-ethoxy-4'-cyanophenyl benzoate | 28% by weight |
| | 4-octyl-4'-cyanophenyl benzoate | 22% by weight |
| | 2-methyl-4-(4-butylbenzoyloxy)-4'-cyanophenyl benzoate | 23% by weight, |
| sample number 34 | 4-methoxy-4'-ethylazoxybenzene | 32% by weight |
| | 4-methoxy-4'-phenylazoxybenzene | 48% by weight |
| | 4-butyl-4'-cyanophenyl benzoate | 20% by weight. |

Figure 8:
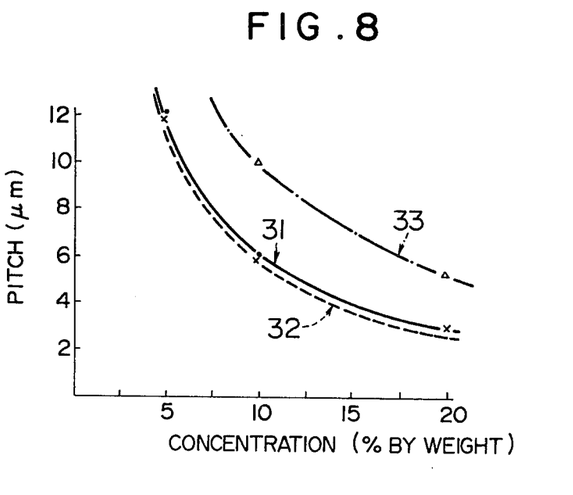
FIG. 8 is a graph for showing a relationship between the concentration of optically active material and the pitch of a cholesteric phase in each of cases when a steroid compound is added as the optically active material to three kinds of nematic liquid crystals.

FIG. 7 shows the relationship between the concentration of optically active material and the pitch in three kinds of liquid crystal mixtures containing the chiralnematic compound, and FIG. 8 shows the relationship in mixtures containing the steroid compound. It is evident from FIGS. 7 and 8 that the chiralnematic compound causes nematic liquid crystals to assume a cholesteric condition with a lower concentration when compared with the steroid compound. By the use of optically active material in a low concentration, the liquid crystal cell can be driven without lowering a temperature range.

It is to be understood that the abovementioned embodiments are only illustrative of the application of the principles of the present invention. In accordance with these principles, many other devices may be devised by those skilled in the art without departing from the spirit and scope of the invention. For example, it is evident to those skilled in the art that devices according to the invention may be of transmission-type or of reflection-type. Further, the nematic liquid crystal, optically active material and pleochroic dye can be appropriately selected.

We claim:

1. A guest-host liquid crystal display device having a guest-host liquid crystal layer sandwiched between a pair of substrate each provided with an electrode for applying an electric field to said liquid crystal layer, in which said electrode and said substrate include surfaces in contact with said liquid crystal layer being subjected to a perpendicular orientation treatment for orienting liquid crystal molecules in contact with said surfaces of said electrode and said substrate with longitudinal axes thereof perpendicular to said surface of said electrode; and said liquid crystal layer includes
    (a) a nematic liquid crystal having a positive dielectric anisotropy,
    (b) an optically active material for imparting to said nematic liquid crystal a phase transition into a cholesteric condition, and
    (c) a pleochroic dye for absorbing light incident on said liquid crystal layer in the absence of an electric field applied to said liquid crystal layer;
wherein a pitch of said cholesteric condition is substantially equal to the thickness of said liquid crystal layer.

2. A guest-host liquid crystal display device according to claim 1, wherein said optically active material is a chiralnematic compound.

3. A guest-host liquid crystal display device according to claim 1, wherein said nematic liquid crystal is of colorless.

4. A guest-host liquid crystal display device according to claim 1 further including a material interposed between said electrode and said liquid crystal layer, said material being one selected from a group consisting of lecithin, a fluorine type surfactant and one of metal oxide in a group of zirconium oxide and yttrium oxide.

5. A guest-host liquid crystal display device according to claim 1, wherein said pleochroic dye is an anthraquinone type dye.

6. A guest-host liquid crystal display device according to claim 1, wherein said liquid crystal layer has a thickness within a range from 5 to 15 $\mu$m.

7. A guest-host liquid crystal display device according to claim 1, wherein a chiralnematic compound is contained, as said optically active material, in said liquid crystal layer in a concentration of 1% to 10% by weight sufficient for the pitch of the cholesteric condition of the liquid crystal layer to be substantially equal to the thickness of the liquid crystal layer, and wherein said pleochroic dye is contained in said liquid crystal layer in a concentration of 0.5% to 5% by weight.

8. A guest-host liquid crystal display device according to claim 1, wherein said liquid crystal layer has a thickness of 10 $\mu$m, and wherein an A.C. voltage of 10 V is applied between said electrodes.

9. A guest-host type liquid crystal display device comprising:
    a pair of substrates, at least one of said substrates being transparent;
    a pair of electrodes provided on said respective substrates, at least one of said electrodes being transparent;
    a guest-host liquid crystal layer including (a) a nematic liquid crystal having a positive dielectric anisotropy, (b) a chiralnematic compound for imparting to said nematic liquid crystal a phase transition into a cholesteric condition, and (c) a pleochroic dye for absorbing light incident on said liquid crystal layer when said liquid crystal layer assumes said cholesteric condition, a pitch of said cholesteric condition being substantially equal to the thickness of said liquid crystal layer;

a pair of orientation films each interposed between said liquid crystal layer and said electrode for orienting nematic liquid crystal molecules with longitudinal axes thereof perpendicular to an electrode surface, thereby putting said liquid crystal layer in a focalconic condition; and a voltage source for applying a voltage between said electrodes, upon the application of said voltage said liquid crystal layer undergoing a phase transition into a homeotropic condition.

10. A guest-host liquid crystal display device according to claim 9, comprising a pair of insulating films respectively interposed between said liquid crystal layer and said electrodes.

11. A guest-host liquid crystal display device according to claim 9, comprising a pair of insulating films respectively interposed between said electrodes and said orientation films.

* * * * *